United States Patent
Körner et al.

(10) Patent No.: US 6,456,919 B1
(45) Date of Patent: Sep. 24, 2002

(54) METHOD FOR CONTROLLING A GEAR-CHANGE OPERATION IN AUTOMATIC TRANSMISSIONS

(75) Inventors: Tillman Körner, Zang; Bernd Dietzel, Syrgrnstein; Günter Willmerding, Oberstotzingen; Franz Trübswasser, Heidenheim; Jakob Haeckh, Sontheim; Herbert Depping, Giengen, all of (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/600,937

(22) PCT Filed: Nov. 25, 1999

(86) PCT No.: PCT/EP99/09107

§ 371 (c)(1),
(2), (4) Date: Nov. 7, 2000

(87) PCT Pub. No.: WO00/31442

PCT Pub. Date: Jun. 2, 2000

(30) Foreign Application Priority Data

Nov. 25, 1998 (DE) ......................................... 198 54 254

(51) Int. Cl.[7] ............................................. F16H 61/02
(52) U.S. Cl. ..................................................... 701/55
(58) Field of Search ............................. 701/55, 56, 54, 701/58; 477/120

(56) References Cited

U.S. PATENT DOCUMENTS

| | | | |
|---|---|---|---|
| 4,473,882 A | * 9/1984 | Suzuki et al. | 364/424.01 |
| 4,889,015 A | * 12/1989 | Kondo | 74/866 |
| 5,063,510 A | 11/1991 | Jorgens et al. | 364/424.1 |
| 5,657,230 A | * 8/1997 | Hess et al. | 364/431.052 |
| 5,730,682 A | 3/1998 | Depping et al. | 477/120 |
| 6,026,342 A | * 2/2000 | Graf et al. | 701/51 |
| 6,157,885 A | * 12/2000 | Sakaguchi et al. | 701/54 |
| 6,188,943 B1 | * 2/2001 | Uchida et al. | 701/54 |
| 6,292,741 B1 | * 9/2001 | Bitzer et al. | 701/115 |

FOREIGN PATENT DOCUMENTS

| | | |
|---|---|---|
| DE | 195 16 948 | 11/1996 |
| DE | 196 38 064 | 3/1998 |
| WO | WO 98/34054 | 8/1998 |

* cited by examiner

Primary Examiner—Michael J. Zanelli
(74) Attorney, Agent, or Firm—Baker & Daniels

(57) ABSTRACT

A process for the control of switching or shifting processes in automatic gears with an allocatable control device for use in drivelines of vehicles with at least one drive motor, especially in the form of an internal combustion engine. In a first process step the actual values of certain travel-dynamics magnitudes for a given time point $t_o$ are detected or calculated; in a second process step there is determined from the actual values a theoretically achievable connection speed of the drive motor, especially the internal combustion engine, in the actually shifted-in gear for each time step; in a third process step the ascertained connection speed is compared with limit speeds that can be stipulated in a characteristic field of the drive motor, in which in dependence on the comparison results in no switching process, or an upshift- or downshift- switching process is initiated by governing of the setting members actuatable for the carrying-out of a gear change.

13 Claims, 7 Drawing Sheets

METHOD FOR CONTROLLING A GEAR-CHANGE OPERATION IN AUTOMATIC TRANSMISSIONS

BACKGROUND OF THE INVENTION

1. Field of the Invention

The invention relates to a process for controlling switching or shifting processes in automatic gears for use in drivelines of vehicles with a drive motor, especially in the form of a combustion engine, individually with the specified features; further, a gear control device.

2. Description of the Related Art

The current trend in vehicles toward a greater space offering, more comfort, a better acceleration and deceleration behavior, for reasons of safety in all traveling condition, as well as the increasing importance of environmental protection aspects, means more demand on the design of drivelines in combustion engine vehicles, an improvement of the energy conversion, from the energy chemically bound in the fuel to the mechanical drive energy required on the vehicle wheels. Besides the improvement of the individual components, the main emphasis there lies on achieving possibilities of fuel saving by optimizing of the driveline by appraisal of the total system, especially of the cooperation between the individual motor and gear components. This demands an optimal adaptation of the gear transmission to the characteristics of the combustion engine, also called motor characteristics, in order to ensure in all traveling conditions and operation of the vehicle a correspondingly favorable fuel consumption value and optimal driving properties. It is well known that the driving performance, the fuel consumption as well as the useful life of the driveline can be considerably influenced by corresponding switching programs of automatic gears. From the state of the art a large number of different switching programs are known which can do justice to the most diverse requirements. The aim there is to achieve a limitation of the working range of the combustion engine to the economical operating points. In the simplest case this is possible by the stipulation of pedal-position dependent fixed switching speeds. There hitherto for reasons of simplicity there was used as switching speed the output turning rate of the gear, which can be assigned in each gear to a certain motor turning rate and which is proportional to the traveling speed. If there the upper limit speed is exceeded, a switching up is performed; if the lower limit speed is fallen below, a switching downward is performed. In traveling operation it is steadily checked whether for the actually traveled condition in actual operation the switching speed is reached or exceeded. If this condition is fulfilled the switching operation is performed. Since during a switching process to be performed, however, also power is transferred, so that there is present the possibility of a further acceleration of the vehicle during the gear change, the motor speed that sets in after the switching process will very much depend on what acceleration has arisen during the switching operation. Thus, it is possible that with an empty vehicle a great acceleration occurs and the motor speed after the switching, therefore, is comparatively high, while with a loaded vehicle a low acceleration occurs and the motor speed therefore is comparatively low. In the first case, with an empty vehicle, because of the necessarily high rate of rotation after the switching, a use disadvantage will occur, while with a loaded vehicle only is the after-the-switching use-optimal. For the avoidance of this disadvantageous effect, therefore, switching programs were developed in which the switching speeds are dependent not only on the load stages, but additionally on the longitudinal acceleration of the vehicle. Such a switching process is described, for example in the publication DE 195 16948 A1. In the process disclosed in this publication the switching-over occurs in dependence on acceleration. Thus depending on the requirements or traveling resistance, switching is done at lower or at higher off-drive or motor speeds, according to whether there is to be preferred a low fuel consumption or a sufficient acceleration. For the switching itself the acceleration of the vehicle or its deceleration is determinative. There, the two following limits—traveling states or accelerations—are always taken into account:

1. low vehicle load on flat or precipitous terrain=high vehicle acceleration and
2. high vehicle load on rising terrain=low vehicle acceleration.

In the first-mentioned case there is yielded then a high vehicle acceleration at low off-drive speeds. A switching-up of the gears, therefore, can occur early already, at a relatively low motor speed, which leads to a lowering of the fuel consumption. For the same reason also the switching-back of the gears occurs with less deceleration at a low motor speed. In the second case a greater motor performance is required, for which reason the switching-up occurs only at a relatively high off-drive speed that corresponds to a high motor speed. In dependence on the measured vehicle acceleration or deceleration the switching-up or switching-down of the gears occurs smoothly between these two traveling states, i.e., within a switching speed range. The switching speed range itself, furthermore, is dependent on the load conditions: with heavier loads, therefore, the switching takes also place at a higher speed.

With this switching program it is achieved that high accelerations lead to a switching-up at lower traveling speeds; the operating point of the motor, i.e., of the combustion engine, is therefore shifted early into a use-favorable range. Simultaneously, through the lower rate of rotation that follows the switching-up, the available motor performance is less. The two effects together lead to a reduction of the fuel consumption. The motor performance thereby limited at high accelerations is there only a desired side effect, which protects the passengers from inadmissible acceleration with empty vehicle. Also in the case of Kick-Down the maximally available power is always attainable, since an upshift does not occur until the regulating speed has been reached.

The designing of such an acceleration-dependent switching program occurs by means of standardized travel maneuvers in the computer. The necessary data on the admissible connection speeds and on the upper limit speeds are obtained there from the motor characteristic diagram. As further parameters there are needed the data of the driveline (converter characteristic curves, axial translation, etc.) and the vehicle data (mass, travel resistances). As the result of the design there is obtained a data set for the switching program, which in the normal case is then deposited in the control of the gear and with which the desired connection speeds are to be achieved without the occurrence of any gear oscillations. An essential disadvantage lies in that the optimal functioning of such an acceleration-dependent switching program requires the individual attuning to the circumstances of the particular driveline, i.e., for example, the axial translation, the existing tire dimension, the type of converter used, etc., from which there results a multiplicity of switching program variants that are expensive to develop and to govern. Also the delivery of the gear often cannot occur with an optimal switching program, whereby complaints and supplementary work are preprogrammed. The frequency of the arising of this type of problems will certainly increase in the future, since the vehicle manufacturer himself as a rule still is ignorant at all the vehicle data for the gear and, in the extreme case, even orders individual gear components separately. A further substantial disadvantage of such a switching program lies in the arising of clear scatterings of the connection speeds, especially in gears with converter operation and especially when the progression ratio is very high.

Underlying the invention, therefore, is the problem of further developing a process for the control of an automatic gear for use in drivelines of vehicles with a combustion engine and preferably an integrated CAN-Bus in such manner that the disadvantages mentioned are avoided. In particular the process for the control of a switching operation is to make possible a switching program which no longer involves any attuning to a certain driveline. The multiplicity of the possible switching program variants is to be reduced to a minimum. The gear itself is to be equipped, on delivery already, with a switching program which from the first setting into operation makes possible an optimal functioning of the automatic gear in association with the combustion engine. Also, severe scatterings are to be avoided between the connection speeds to be reached under the same conditions.

BRIEF SUMMARY OF THE INVENTION

According to the invention the disadvantages mentioned are avoided by a so-called real-time prognosis of the connection speed to be achieved in the target gear. The conventional sets of data, in conventional switching programs for load-conditions, acceleration-, and speed-dependent switching speeds are now replaced by the characteristic diagram of the motor, in particular of the combustion engine. As a rule it is a matter here of a power/speed diagram or of a torque/speed diagram. The motor characteristic diagram either can be generated directly in the gear control and deposited there, or it can be put in or read-in and stored.

Preferably the process of the invention is used with an integrated CAN-bus. In this case the motor characteristic diagram is already deposited or stored in the CAN-Bus, and it is possible to fall back upon it from the gear control. Thereby no data are any longer to be preset for the switching points and the control of the gear adapts itself. As motor characteristic diagram, here it is possible to use a motor performance-motor speed characteristic diagram or a so-called torque/speed characteristic diagram of the motor. There, insofar as possible, vehicle-specific data are taken from the CAN-Bus or computed from measurement values that are available there and that can be called in.

The solution according to the invention makes available an automatic gear with a switching program which requires no individual attuning to a certain driveline. The gear can be delivered with a switching program already, and in an initial setting-in-operation it passes into an optimal functioning, since the requisite data are automatically generated from the motor characteristic diagram.

The process for the control of the switching process proceeds according to the invention in the following steps:
a) Detection or determination of the movement-dynamic magnitudes at a certain time point $t_o$
b) Determination of the theoretically achievable connection speed of the drive mechanism, especially of the combustion engine, n__mot__pr__h in the target gear $g_{tgt}=g_{act}+n$ with n=1, in which for gear systems with a greater number of gears, several target gears can also be investigated so that, for example there holds n $\epsilon$(1, 2, 3), or n__mot__pr in the actually inserted gear $g_{act}$ at the time point $t=t_o+t_{shift}$
c) Comparison of the prognosticated connection or target speeds with stipulatable limit speeds and decision about
    $c_1$) the carrying-out of a switching operation and
    $c_2$) the type of switching (upshift or downshift) in dependence on the result of comparison.

For a switching process to be undertaken, in the first process step at the time point $t_o$, at least the following dynamic magnitudes are determined:
n__mot—motor speed
n__ab—output speed of the gear
Ped—gas pedal position
Ped__br—brake pedal position
a magnitude (v or $i_{axial}$, $\Gamma_{dynamic}$ together with the driven speed (n__ab) characterizing the raveling speed at least indirectly.

When the gear system is used in vehicle with an integrated CAN-Bus as communication interface between different control arrangements or with a similar system, these magnitudes can be in part derived from the latter; in part, however, special sensors are required. There the magnitudes motor speed, gas pedal position, brake pedal position, and traveling speed can be taken from the CAN-Bus as source, while for the detection of the output speed of the gear, as a rule, a corresponding arrangement is necessary at the gear system output. The above-mentioned magnitudes represent there the magnitudes required for the functioning of the process of the invention. In order to do justice to additional demands, for example the avoidance of unnecessary switching operations and the making possible of a fuel-saving traveling behavior with sufficient traveling performances, additional physical magnitudes can be drawn upon for the gear control. These magnitudes, as a rule, are also available over the CAN-bus or can be determined via magnitudes available over the CAN-bus. To these there belong:
P__mot—motor performance
$b_e$—characteristic diagram of the specific fuel consumption
B—injection amount
Characteristic diagram of the specific emissions
p—barometric pressure
Psi__Point—yaw angle speed In the other case, i.e., in use of vehicles without such a communication interface, for the detection or determination of the individual magnitudes corresponding arrangements are to be provided, preferably in the form of sensors.

The determination of the theoretically achievable connection speed of the drive machine, especially of the combustion engine n__mo__pr__h in the target gear $g_{gtg}=g_{act}+n$ or n__mot__pr in the actually set-in gear $g_{act}$ at the time point $t=t+t_{shift}$ occurs continuously at time intervals of ca. 1 to max. 10 milliseconds, which are dependent on the capacity of the processor used in the control, especially also its clock frequency. The switching duration $t_{shift}$ fluctuates slightly and amounts, for example, to between 1 and 2 s. For the concrete establishment of the switching duration it is possible to proceed from a basic advance value, which on undertaking of a large number of switching operations can be modified or adapted on the basis of the result present at the end of the switching process. The modification can occur there adaptively, through a regulation or a combination of both processes. In this manner of procedure it is reasonable to resort to a correction value which describes the deviation of the actually setting-in speed from the predicted connection speed. Thus, for example, for each executed switching the correction value can be determined from the prognosticated connection speed of rotation, and from the setting-in connection speed of rotation, it being possible to deposit this latter in an experiment table.

Another possibility, with the reproducibility of the switching time, lies in realizing an improvement by taking into consideration the underlying physical interrelationships and calculating the theoretical switching duration. Thus, for example, there can likewise be included the kinetic excess energy of the motor which is transformed into heat during the switching operation.

With the limit speeds mentioned under process step c) it is a matter of the generally maximally and minimally admissible two curves of the motor speeds, which establish an upper speed limit range and a lower speed limit range in the motor characteristic diagram, and therewith bound its working range.

The establishment of the stipulated limits for the switching speeds (lower curve of the minimally admissible switching speed and upper curve of the maximally admissible switching speed) occurs by automatic generation from the motor characteristic diagram, in dependence on characteristic points in this. The generation occurs over the gear control. There the reference to the load stages in the process of the invention is abandoned, since the access to the gas pedal position can occur stagelessly in the use in vehicles with integrated CAN-Bus or a similar communication interface between individual control devices over the so-called CAN-Bus. The limit curves for the upper and lower speed limit range can therewith be generated by stageless curves. By the term CAN there is understood there the so-called CAN-Bus, a conduction pair which, like a nerve path, connects the individual control devices in the vehicle with one another. This conduction pair serves there primarily for the communication of the control devices among one another. The individual control devices are cross-linked there by a communication system which is capable of conducting the necessary data exchange.

In the so-called CAN-Bus, for example, one control device takes up the information for the speed (rate of rotation), transforms this into a form readable for all the other control devices and sends this message to the CAN-Bus, from where it can be called in for all the other control devices.

In the other case, with backing of the motor characteristic diagram in the gear control by reading-in of the corresponding data or programming, i.e., non automatic access to the characteristic data with coupling of the gear control with other control arrangements, in the use in vehicles without communication interfaces, the limit speeds are generated or derived in the same manner from the motor characteristic diagram stored in the gear control.

In the simplest case so-called basic limit speed ranges are established which for the achievement of additional advantageous properties have boundaries that are reducible and/or shiftable with respect to the basic speed limit range. The upper basic speed limit range, i.e., the so-called upshift line, is established there by at least three points $P_{h1}$ to $P_{h3}$. In order to establish the coordinates for upshifting or downshifting, values in the form of factors, for example $K_{h1}$, $k_{h2}$, $k_{h3}$ and $k_{r1}$, $k_{r2}$, are to be determined in such manner that these are valid for virtually any motor. The establishing of the factors there can occur with the aid of a large number of real motor characteristic diagrams, and can be ascertained according to statistical criteria. The individual points are then determined as follows:

point $P_{h1}$=(speed (rpm)$n_{h1}$=$k_{h1}\times n_{regulated}$ M on full load line)

point $P_{h2}$=($n_{r2}$=max$\{k_{h2}\times(n_{regulated}-n_{min})+n_{min}$; $n_{r2}\times i_{spr}\}$,; M is yielded by the intersection with the line of a certain specific fuel consumption $b_e$, for example $b_e$=230 g/kwh)

point $P_{h3}$=($n_{h2}$=max$\{k_{h3}\times n_{h2}$; $n_{r3}\times i_{spr}\}$; M=0)

For the determination of the lower basic speed limit range likewise at least three points $P_{r1}$, $P_{r2}$ and $P_{r3}$ are necessary.

$P_{r1}$ corresponds there to the bend-off point of the full load line with constant motor moment, when the full load line is run through downward-falling speeds.

$P_{r2}$ is yielded from the intersection of the full-load line with the characteristic curve (line) for the specific fuel consumption which was used for the establishing of the second point $P_{h2}$ or this is determined from the relation $n_{r2}$=$k_{r2}\times n_{r1}$.

$P_{r3}$ is yielded from the dropping of the plumb line from point $P_{r2}$ onto the speed axis.

As additional requirement, the range established by the basic speed curves must have further, for the avoidance of gear oscillations, a speed ratio greater than the maximal gear leap $i_{spr}$. For this reason there holds:

$$n_{h3}/n_{r3}>i_{spr}.$$

This leads to the above-mentioned conditions for $n_{h2}$ and $n_{h3}$ by the stipulation of which gear oscillation are to be dependably avoided and the thus-defined working range of the motor should lead to a faultless switching behavior, in which the demands of a use-favorable operation are also covered.

For the achievement of advantageous properties additional restrictions of the working range of the combustion engine by change of the basic limit speed range are possible. A restriction of the working range of the combustion engine is conceivable in respect to the use-favorable behavior in dependence on traveling dynamics and on the wish of the driver. The consideration of these magnitudes, however, presumes additional sensors for their detection. If these sensors drop out, there remains preserved, however, the basic limit speed range and therewith the basic working range of the combustion engine. The bounding-in of the working range can occur, for example, inter alia in dependence on the following magnitudes: The bounding-in of the working range can occur, for example, inter alia in dependence on the following magnitudes:

The bounding-in of the working range can occur, for example, inter alia in dependence on the following magnitudes:

Gas pedal speed and/or

Vehicle mass and/or

Roadway gradient.

With a high gas pedal speed, i.e., the desire for more power, the admissible speed range should be shifted to higher admissible speeds with respect to the working range bounded by the basic limit speeds. Thereby it becomes possible that for the driver, who has shown impatience because his gas pedal movement, an increased performance readiness is made available, as the lower motor speeds can no longer be used.

As a further criterion the vehicle mass can bring about a displacement of the working range. An empty vehicle, therefore, operates with working range shifted to the left. If the vehicle is full, the working range is shifted to the right in the torque/speed characteristic diagram of the motor. A statement similar to the one for the vehicle mass also holds for the roadway gradient.

Since the process of the invention is used preferably in automatic gears of vehicle drivelilnes which are equipped with a CAN-bus or a similar system, the control device of the gear control can resort to the motor characteristic diagram stored in the CAN-bus. The gear control then generates, on first setting in operation of the driveline, at least the basic limit speeds in the motor characteristic diagram and therewith bounds the working range for the cooperation motor-gear cooperation. In the event that further advantageous properties of the switching processes to be undertaken (for example the execution of switching operations only in the range most favorable for use) are to be achieved, this can likewise be taken into consideration in the generating of the limit speed ranges. The corresponding algorithm for automatic generation of the basic limit range or of the possible restrictions of this range is a component of the gear control and is likewise included with delivery of the gear and of the appertaining control device. The motor characteristic diagram restricted in this manner with respect to the working range can then be deposited in a storage unit of the gear control and/or in the CAN-bus. Further, in the gear control there is deposited the algorithm for the decision on the performance and for the choice of the type of switching process to be realized, which (process) is continuously delivered. The corresponding input magnitudes to be considered, as already stated, are largely taken from the CAN-bus or fed to the gear control via corresponding couplings with the detection arrangements required therefor. The gear control system further has, for the realization of the process of the invention, a computing arrangement which determines the hypothetically attainable connection speeds in the target gear to be set in and/or the gear still present in the case of non-occurring switching. The calculating arrangement is coupled with a comparison to which at least the calculated magnitudes and the limit speeds for the processing can be fed. In correspondence to the result of the comparison at least one control magnitude is generated and issued for the setting members to be actuated for the gear change to be implemented. The gear change is executed or is not executed. The calculating arrangement for the determination of the hypothetically attainable connection speeds and the calculating arrangement for the setting of the limit speed ranges can be comprised in one component, but they do not have to be. The further processing of the control magnitude or control magnitudes for the governing of the setting members to be actuated for the gear change depends, there, on the type of gear, of construction, and of setting arrangements to be actuated and it lies therefore within the range of competence of the responsible specialist.

BRIEF DESCRIPTION OF THE SEVERAL VIEWS OF THE DRAWINGS

The solution according to the invention is explained in the following with the aid of figures. In these there is represented in detail the following.

DETAILED DESCRIPTION OF THE INVENTION

Figure 1:
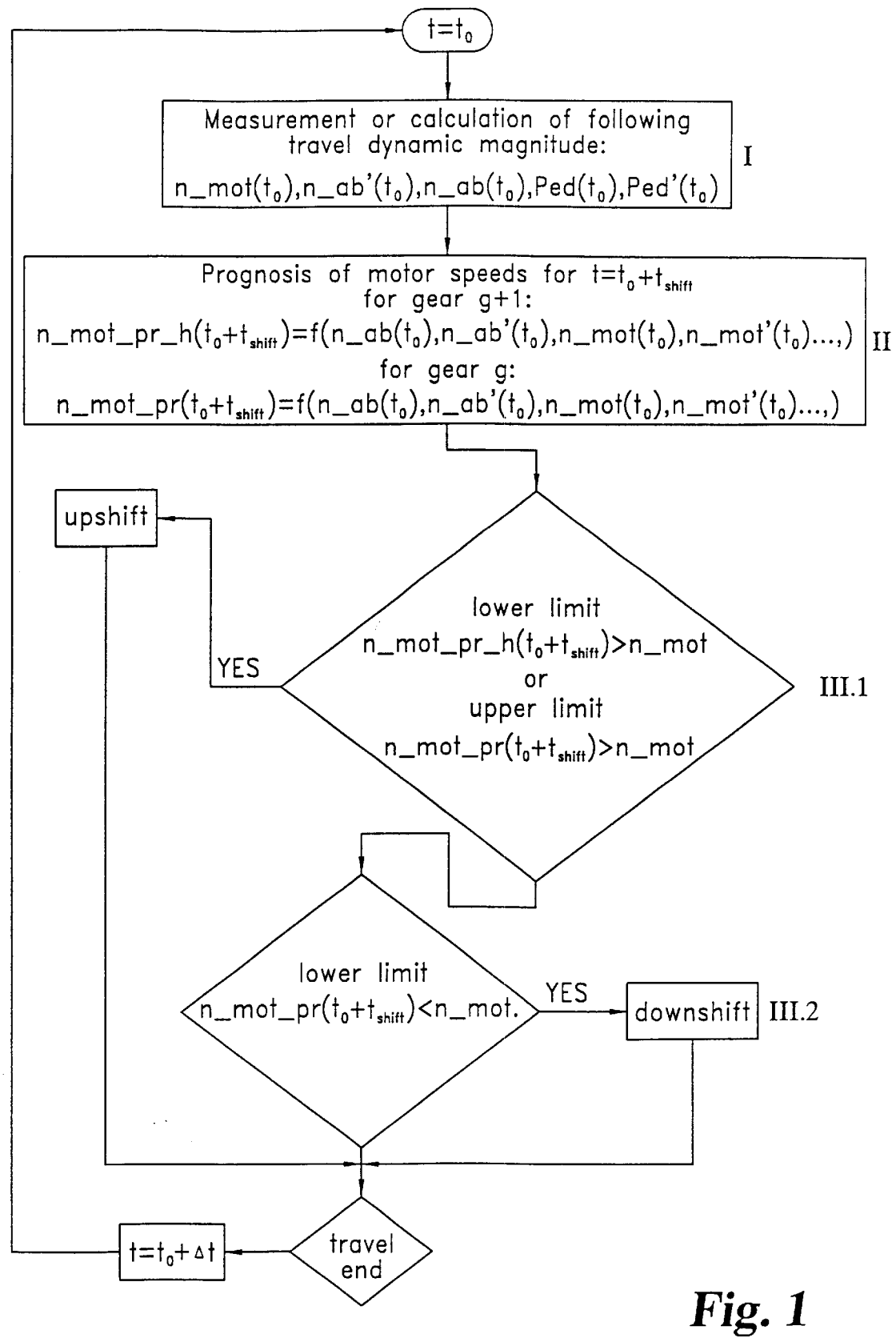
FIG. 1 explains with the aid of a signal flow diagram in schematically simplified representation the basic principle according to the invention for the control of the gear change in automatic gear between two gear stages.

FIG. 1 explains with the aid of a signal flow diagram and in schematically simplified representation the basic principle of the invention for the control of the gear change in automatic gear systems between two gear stages. All the required input data for this process relate there only to the drive machine, especially the combustion engine, and are automatically determined. Essentially the process comprises three process steps. In a first process step 1 and at a certain time point to there are determined, i.e., detected or calculated, at least the following dynamic magnitudes:

n_ab—Output speed at the gear output n ab'—Output speed acceleration at the gear output n—mot—Motor speed n—mot'—Motor speed acceleration Ped—Gas pedal position Ped'—Speed of change of the gas pedal position For each time step $t-to+t_{shift}$ in a second process step there is determined from the detected or calculated actual magnitudes the theoretically attainable connection speed of the drive machine in the target gear. In detail and for a hypothetically assumed upshift operation, there is calculated the connection speed, i.e., the target speed of the drive machine, particularly that of a combustion engine, n_mo_pr_h and for the actual gear stage still laid in for this time point there is calculated the motor speed n_mot_pr from the measurement values for the future time point $t=t_o+t_{shift}$. The index pr used stands there for prognosis. The two hypothetically determined connection and target speeds, respectively have, here, the following signification:

n_mot_pr_h=prognosticated motor speed for the time point $t=t_o+t_{shift}$ in the target gear, i.e., in the gear stage g+1 of g+n after upshift from the gear stage g.

n_mot_pr=prognosticated motor speed for the time point $t=t_o+t_{shift}$ in the gear stage g, if it were not shifted.

In a third process step III the prognosticated connection or target speeds are compared with stipulated limit speeds. With the limit speeds it is a matter there of the curve of the maximally and minimally admissible motor speeds which characterize an upper speed range and a lower speed range in the motor characteristic diagram. These bound the working range of the motor, especially of the combustion engine. The matter of stipulation or generation of the characteristic curves for the upper and lower speed ranges in the motor characteristic diagram will be gone into in detail in the description for FIG. 2. The lower speed limit range determines there the lower admissible motor speeds in the motor characteristic diagram, while the upper speed range characterizes the upper limit speeds in the motor characteristic diagram.

In the third process step III there occurs a comparison of the prognosticated connection or target speeds with the lower admissible motor speed in the motor characteristic diagram, or with the upper admissible motor speed in the motor characteristic diagram. In detail there, in a first partial step III.1 the prognosticated motor speed for the time point $t=t_o+t_{shift}$ in the gear stage g+1—after a hypothetically assumed completed upshift from gear g into the next higher gear—is compared with the admissible motor speed in the motor characteristic diagram. If there the prognosticated speed n_mod_pr_h lies above the desired connection speed of the motor, then in actual fact there is made an upshift by one gear stage; i.e., at least one output signal for the governing of the setting members to be actuated for the execution of the switching (shifting) process has been generated. If alternatively the prognosticated motor speed for the time point $t=t_o+t_{shift}$ in the gear stage g, when switching (shifting) is not performed, lies above the upper limit speed, then likewise an upshift is performed. If, however, it lies below the lower admissible motor speed, i.e., below the lower speed limit range, then a downshift is executed. This corresponds to process step III.2. When neither condition is unfulfilled, then no switching operation is performed.

For an algorithm meant to prognosticate the connection speed, it is possible to proceed as basis, for example, from the following equation:

$$n\_mot\_pr\_h(t_o+t_{shift})=(n\_ab'(t_o)\times t_{shift}+n\_ab(t_o)\times i(g+1)+f\_korr$$

There it is assumed for the calculation that the output acceleration, i.e., the acceleration on the gear output, does not change during the switching process. Significant for this appears to be the definition of a correction value f_korr which describes the deviation of the actually achieved connection speed from the predicted connection speed. There is present there the possibility of calculating this value for every executed switching from the difference between the calculated, i.e., prognosticated, and the actually achieved connection speed, and of storing it into a so-called experiment table, in which also additionally there can be stored the conditions that were present at the time point when the switching process was triggered. In a renewed switching process, switchings with comparable output conditions could be extracted from the table and the connection speed could be computed with the aid of the correction value given there. In order, however, to group similar switching together from a limited number of switching operations, these switchings must be classified. This may be done in several ways. It is thinkable, for example, to provide for each of the physical magnitudes to be detected or to be calculated between a minimal value and a maximal value, a certain number of classes, so that in this manner comparable switching operations can be found even with relatively few measured values. Preferably, however, for every possible gear stage the table should contain at least ca. 50 comparative switching operations.

Under a further aspect of the invention there are likewise taken into consideration additional data such as, for example, those relative to mass and slope for the achievement of advantageous properties with respect to the switching process. This presumes, however, the presence of corresponding detection means, for example in the form of sensors. These could contribute to the possibility of finding comparable conditions, for ascending gradients for example, which would lead to a narrower bounding of the conditions of a certain switching operation, and therewith would facilitate the finding of a comparable switching operation circuit.

Further improvements of the gear control in the gear stage change can be generated at will by a permanent data detection in the control device, in which additionally for example the tarrying times per gear stage are stored in a speed-torque matrix. An evaluation of this matrix can then be used for the automatic correction of the switching program if it is recognized that driving frequently id done at unfavorable operating points.

In supplement to the speed-torque matrix a kick-down matrix can additionally be introduced. In this matrix the number of kick-down switching operations for each gear can be counted and likewise represented in a speed-torque matrix. Accumulations of individual points lead to the display of possible weak points in the control system.

Likewise in addition to the weak point identification a so-called oscillation matrix can be set up. In this, for each gear stage the gear oscillations are registered in a torque-speed matrix. This takes place in such a form that there is stored the speed-torque class that was present before the oscillating switching. An accumulated occurrence then shows that obviously the switching program does not operate optimally under the actual conditions.

In the following Table 1 there are again summarized the necessary magnitudes to be taken into account according to the process of the invention, for the decision of a gear stage change to be executed. The additional magnitudes to be taken into account for the execution of the switching process, especially for bringing about an improvement of the switching ease are not taken into account there.

The physical magnitudes given in the following table for the control of the gear change are to be used to obtain a fuel-saving driving behavior, but also, simultaneously, a behavior corresponding to the driver's wish. The indication "Start value necessary" means that for the first setting in operation of the vehicle an indication must already be present in the data set; otherwise no proper functioning would be possible in the setting in operation of the gear. The indication "dispensable" leads to the establishment of the magnitudes absolutely necessary for this manner of functioning.

The source indications for the travel-dynamics magnitudes refer there also to the preferred application of the process with use of automatic gears in vehicles with integrated CAN-bus or a similar communication system. In vehicles without such communication interfaces these magnitudes are determined over separate detection means or calculated from the detected magnitudes. The indications made in the table in regard to the dispersibility are binding, however, for both vehicle outfitting.

TABLE 1

| Magnitude | Source | Dispensable? | Start value necessary? |
|---|---|---|---|
| Motor speed n_mot [l/min] | CAN-BUS | no | no |
| Output speed Gear n_ab (l/min) | Speed sensor on the gear output | no | no |
| Traveling speed v [km/hr] | CAN-BUS | yes, if $i_{axial'\ rdyn}$ is input into control set | if not present, axial translation and wheel radius are necessary |
| Motor performance P_mot [kW] | CAN-BUS | yes, but then only control over speed | no |
| Characteristic available of the in CAN specific. fuel consumption b_e [g/(kWh)] or injection amount B [kg/h] | CAN-BUS | yes, if less than 6 gears | no, if |

TABLE 1-continued

| Magnitude | Source | Dispensable? | Start value necessary? |
|---|---|---|---|
| Characteristic diagram for the specific emissions for Nox, particles [g/(kWHh)] [kg/h] | CAN-BUS | yes | no |
| Gas pedal position Ped [%] | CAN-BUS | no | no |
| Brake pedal position Ped_br [%] | CAN-BUS | no | no |
| Barometric pressure p [Pa] | CAN-BUS possibly plus sensor | yes | no |
| Yaw angle speed psi_point (%) | CAN-BUS | yes | no |

The following Table 2 explains the magnitudes derived or determined from the magnitudes required in Table 1 in the second process step.

TABLE 2

| Magnitude necessary? | Calculated from | Dispensable? | Start value necessary? |
|---|---|---|---|
| Speed acceleration n_mot [1/(min s)] | d (n_mot)/dt | yes | no |
| Rotary acceleration gear output speed n_ab' [1/(mins$^2$)] | d (n_ab)/dt | no | no |
| $r_{dyn}/i_{axial}$ | Speed and output speed (rpm) | no | Estimated value suffices |
| Longitudinal acceleration a [m/s$^2$] | n_ab' × $r_{dyn}/i_{axial}$ | no | no |
| Gas pedal speed Ped' [% s/] | d (Ped)/dt | no | no |
| Longitudinal slope of the roadway α [degrees] | {h(t)−h(t−dt)}/{s(t)−s(t−dt)} | yes | no |
| Vehicle mass m [kg] | from CAN-BUS (pressure of the air spring bellows) or by calculation from longitudinal acceleration, roadway slope, motor performance | yes | no |

For the meaning of the individual magnitudes:
a) Motor speed and its derivation:
   The motor speed and its derivation are available in a very simple manner and they can help decisively to improve the hitting accuracy on reaching of the connection speed of the motor. Since the kinetic energy of motor and gear abruptly change during a switching and can therewith influence the vehicle acceleration, the motor speed is to be taken into account in every case.
b) Output speed of the gear and its derivation:
   From these magnitudes there can be determined the traveling speed and the lengthwise acceleration of the vehicle.
c) Traveling speed:
   The traveling speed is necessary for the determination of the translation between gear output and wheel, so that these magnitudes must be calculated independently and no longer have to be stipulated. On the other hand, the traveling speed can be derived from these magnitudes on stipulation of the translation between the gear output and the wheel and dynamic running radius.
d) Motor performance:
   The motor performance (or by way of replacement the motor torque and the speed) can be used as additional magnitude, especially if the gear system has a relatively high number of gears and thereby switching operations of more than one gear are possible: the gas pedal position of the driver is then interpreted as performance wish and the gear control system selects insofar as possible only gears which can make available operating points with equal performance.
e) Specific fuel consumption:
   The specific fuel consumption, which can be calculated from injection amount and performance, will reasonably be used if the switching is to be done through more than one gear. Then also the specific consumption can be used for the gear choice.
f) Emission characteristic values:
   Emission characteristic values are becoming more and more important. They are present in a form similar to the motor characteristic diagram and it may possibly be desired to draw upon these data for the control. Under certain conditions (for example high accelerations) certain characteristic diagram ranges will be avoided (to the left of be_min because of particle emissions), which must be realized by means of additional conditions in the control.
g) Gas pedal position:
   The gas pedal position represents the driver's desire for performance and is therewith a decisive magnitude. Kick-down now as before is to make available the point of highest possible performance.
h) Speed of change of the gas pedal position:
   Speed of change of the gas pedal position presents a measure for the intensity of the driver's wish. High speeds signalize the driver's impatience and should bring about a rapid readying of the available motor performance. This magnitude is already used now in many automatic gears for the control in passenger cars. In addition to the actual value of the gas pedal speed, this can also be recorded and evaluated over a certain period of time (for example 30 seconds). If in this space of time frequent gas pedal movements occur, then this fact should be included in the gear selection.
i) Ascending gradient of the travel interval:
   The knowledge of the gradient of the travel interval serves as a supplement for the determination of the travel resistances, whereby the performance need for constant travel can be calculated. Thus in an upward travel a greater performance should always be available than in downhill travel. The gear control should take into account this travel-dynamics perceptive desire.
j) Vehicle mass:
   The taking into account of the vehicle mass magnitude has an effect similar to taking into account the rising gradient of the travel interval. A great vehicle mass means for the gear control that switching is done at higher speeds than with a lower vehicle mass. The vehicle mass can be determined via the pressure of the air bellows (if present in the CAN-bus) or else by evaluation of the motor performance, of the lengthwise acceleration, and of the travel resistances.
k) Brake pedal force:
   The brake pedal force represents the driver's wish for braking force and is therefore decisive for the drive of the retarder and/or of the operating brake. Braking leads to a speed reduction, whereby switching processes are triggered. The information that the driver needs no drive performance must likewise be taken into account in the choice of the switchings.

l) Yaw angle speed:

It is a known practice to take into account the yaw angle speed. In the future, the sensor used for this could also be used in buses for stability control, and therewith would also be available for the purpose of the gear control. The use of the information is very simple. If the value of the yaw angle speed increases, then the vehicle is running into a curve and an upshifting of the gear should be omitted. If the value of the yaw angle speed decreases, the vehicle is traveling out of a curve and it is possible to upshift. A further possibility then lies in taking into account the steering angle movement for the detection of upward travel, which is possible with the pattern of the steering angle movement characteristic for serpentine travel. A certain mountainous driving program is then followed.

Figure 2:
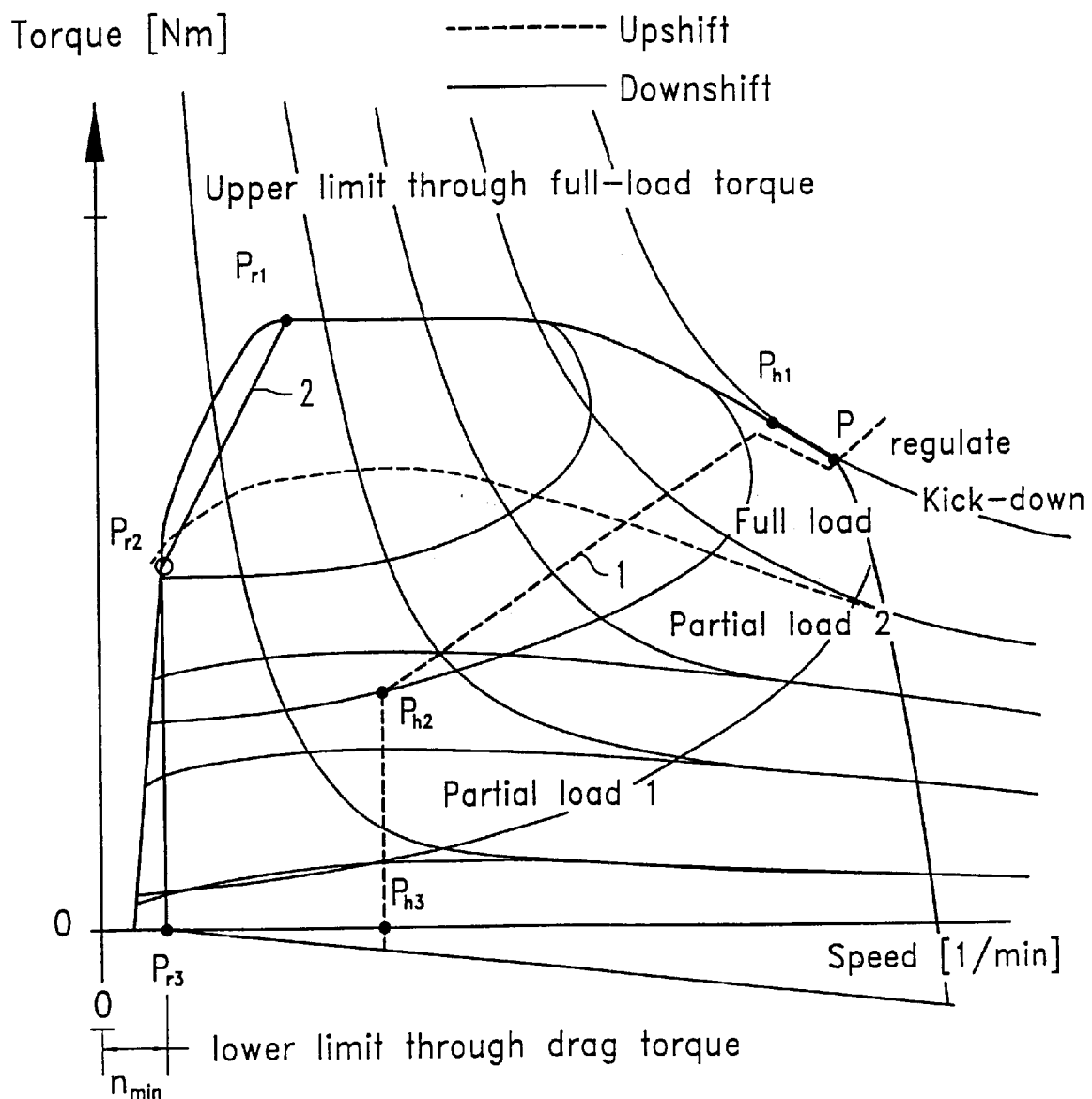
FIG. 2 explains with the aid of a motor characteristic diagram the generation of the bounding of the working range by the characteristic lines (curves) for the maximal and minimal limit speed.

FIG. 2 explains with the aid of a torque-speed diagram a possible automated fixing of the prescribed limits for the switching speeds by automatic generation from the motor characteristic diagram. According to the invention the setting of the maximally and minimally admissible limit speeds occurs in dependence on characteristic points in the motor characteristic diagram. There the reference to the load stages in the process of the invention is abandoned, since the access to the gas pedal position can occur stagelessly over a so-called CAN bus. The limit curves for the upper and lower speed limit angle can thus be generated by continuous curves. By CAN there is meant the so-called CAN-Bus, a conductor pair which, like a nerve course, joins the individual control devices in the vehicle with one another. This line pair serves there primarily for the communication of the control devices among one another. In order to establish the bond between the individual control devices there are theoretically two different possibilities:

a) the individual control devices are grouped together into a comprehensive central electronic system b) the individual control devices are cross-linked by means of a communication system that is capable of carrying out the necessary data exchange.

With the so-called CAN-Bus, for example, a control device receives the information for the speed (rpm), transforms it into a form readable for all the other control devices, and sends this message onto the CAN-Bus, from which they can be called upon for all the other control devices.

The upper speed limit range, i.e., the so-called upshift line, here designated with 1, is set according to the invention by at least three points; these are designated with $P_{h1}$ to $P_{h3}$. For this, values are to be determined in the form of factors, here the factors $k_{h1}$, $k_{h2}$, $k_{h3}$, in such manner that they are valid for every motor. This determination can occur with the aid of a real motor characteristic diagram, and it can be ascertained according to statistichal criteria. For the point $P_{h1}$ there is yielded the speed $n_{h1}$ from the product of $k_{h1}$ by $n_{regulated}$. The upper limit range in the speed-torque characteristic field is established by the full-load line. For the point $P_{h2}$ a certain specific fuel consumption be was chosen, for example $b_e$=230 g/(kWh). The speed $n_{h2}$ required for finding the appertaining coordinate in the speed-torque characteristic diagram is yielded from:

$$n_{h2}=\max\{k_{h2}\times(n_{regulated}-n_{min}); n_{r2}\times i_{spr}\}$$

The third point $P_{h3}$ required for the characterization of the upshift characteristic line lies on the speed axis, i.e., the transferable torque is equal to zero. The appertaining speed is:

$$n_{h3}=\max\{k_{h3}\times n_{h2}; n_{h3}\times i_{spr}\}$$

For the determination of the lower speed limit range 2, likewise, at least three points are required; these are designated with $hP_{r1}$, $P_{r2}$, and $P_{r3}$. The point $P_{r1}$ corresponds there to the bend-off point of the full load line with constant motor torque. The point $P_{r2}$ is yielded from the intersection point of the full load line with the characteristic line (curve) for the specific fuel consumption which is used for the establishment of the second point $P_{h2}$. If the full load line in this range of very low speed is no longer available, then the speed $n_{r2}$ can be determined from the condition $n_{r2}=k_{r2}\times n_{r1}$. The third point $P_{r3}$ is yielded from the dropping of a plumb line from point $P_{r2}$ onto the speed axes. The values $k_{h1}$, $k_{h2}$, $k_{h3}$, $k_{r1}$ and $k_{r2}$ are determined with the aid of real motor torque diagrams, for example by tests carried out so that they are valid for virtually every motor used.

As an additional requirement the range established by the limit curve must have, further, for the avoidance of gear oscillations, a speed ratio greater than the maximal gear jump $i_{spr}$. For this reason there holds:

$$n_{h3}/n_{r3} \geq i_{spr}$$

This leads then to the above-mentioned conditions for $n_{h2}$ and $n_{h3}$. By the stipulation of these conditions gear oscillations should be dependably avoided, and the thus defined working range of the motor should lead to a faultless switching behavior which also takes into account the demands of use-favorable operation.

The characteristic curves of the limit speeds 1 and 2 represented in FIG. 2 are the basic limit speeds that are generated from the motor characteristic diagram for minimal requirements.

A further additional problem to be taken into account is posed with the use of a hydrodynamic converter with bridging coupling. Besides the switching of gears, namely with a converter, the bridging coupling must also be opened and closed. Typically for a converter there are operating points that lie on a family (or group) of parabolas. If, however, these parabolas in the motor characteristic diagram are represented with the parameter-speed ratio (quotient of turbine speed $n_T$ and motor speed $n_{mot}$), then the operating behavior can be analyzed very well.

The turbine wheel itself is rigidly connected with the mechanical part of the planetary drive and with the output, wherewith the turbine speed is proportional to the traveling speed. If the vehicle is at a standstill, then also the turbine speed and therewith the speed ratio is equal to zero. The converter parabola family of curves is driven through in a starting operation, with converter at fill load, for example, in the sequence of the intersection points with the full load line. With increasing traveling speed the operating point migrates to the right in the direction of higher speed and therewith also in the direction of a more unfavorable specific consumption. As a countermeasure, the closing of the converter bridging coupling leads to a considerable motor pressuring, so that thereby the specific consumption is improved. To be sure, then also the motor performance is abruptly reduced. For this reason it is provided according to the invention that the opening and closing of the converter-bridging coupling also is to take place according to the same criteria as with a gear change. Formally this could be realized there in such manner that, for example a 6-gear system, with the two first gears that can be driven in converter operation conceived of as an 8-stage gear system. The first gear stage corresponds then to the first gear inclusive of converter operation, the second stage corresponds to the first mechanical gear with bridging coupling, etc.

In an upshift from the first gear stage into the second gear stage, it is not a purely mechanical gear that is switched, but the bridging coupling is closed; in the switch-back from the second into the first stage the bridging coupling is opened.

Preferably auxiliary conditions in the converter operation are agreed upon in a suitable manner, since starting processes can lead to unsteady motor behavior, so that a too-early a converter bridging may be a problem problematic, since the stationary motor torque is still not at all available. For this reason it can be agreed upon as an additional condition that the closing of the converter coupling is to take place only when a certain motor performance $P_{mot,mn}$ is exceeded. As first proposal for the fixing for the intended motor performance there is proposed the performance at the point $b_{e,min}$.

Figure 3:
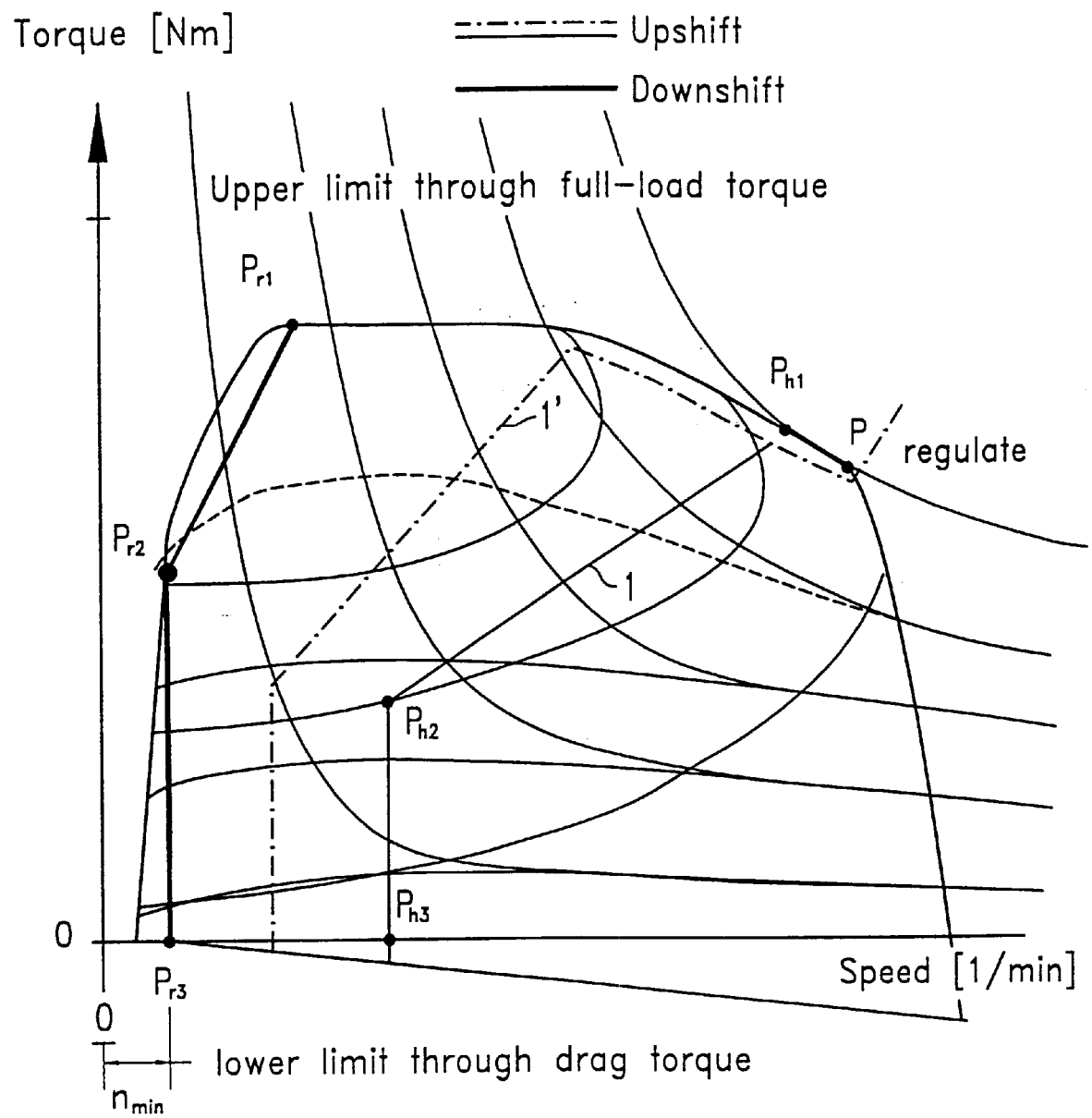
FIG. 3 explains a motor characteristic diagram according to FIG. 2 with bounding of the working range for the improvement of the use behavior.

Additional limitations of the working range of the combustion engine can give rise to advantageous properties, for example of the consumption behavior as represented in FIG. 3. FIG. 3 explains there a restriction of the working range of the combustion engine in respect to use-favorable behavior in dependence on traveling dynamics and driver's wish. The characteristic line for the upper limit speed, here, is represented for this case in broken lines and designated with 1' and with respect to the basic limit speed characteristic line 2, which for purposes of comparison is plotted by means of a thin line, shifted toward lower speeds. This widening of function, however, presumes additional sensors for the detection of certain magnitudes. If the latter drop out there remains preserved, however, the functional capacity described in FIG. 2, i.e., the broad working range of the motor.

The limitation of the working range can occur, for example, in dependence on the following magnitudes:

Gas pedal speed and/or

Vehicle mass and/or

Roadway gradient.

With high gas pedal speed, i.e. a desire for more performance, the admissible speed range there should be shifted to higher admissible speeds with respect to the working range explained in FIG. 2. Thereby it becomes possible that, for the driver who has shown impatience by his gas pedal movements, an increased performance readiness is made available, as the lower motor speeds can no longer be used.

Figure 4A:
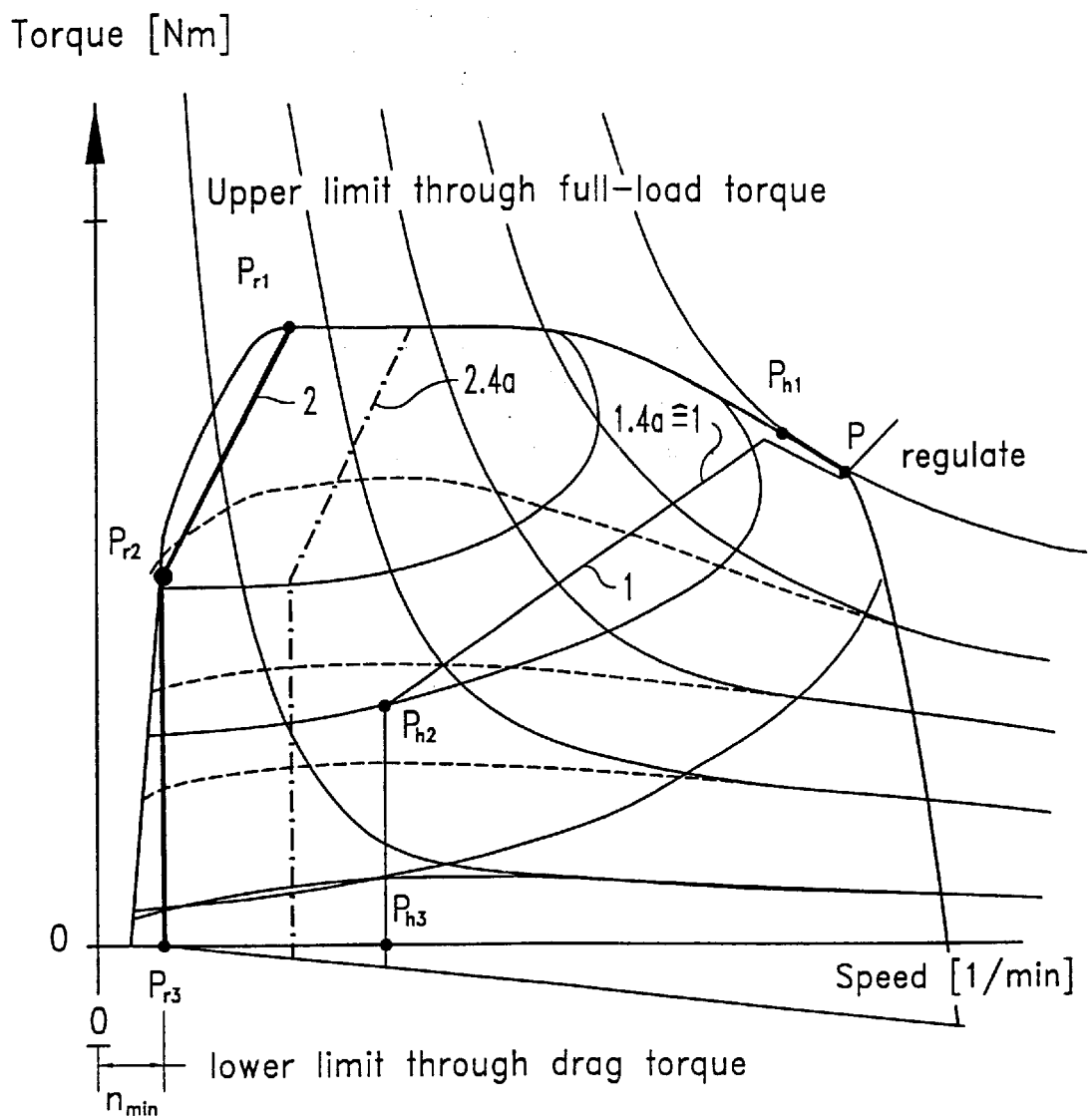
FIGS. 4a to 4c explain with the aid of a motor characteristic diagrams, possible boundings of the working range with respect to the basic working range represented in FIG. 2 for different demands.
Figure 4B:
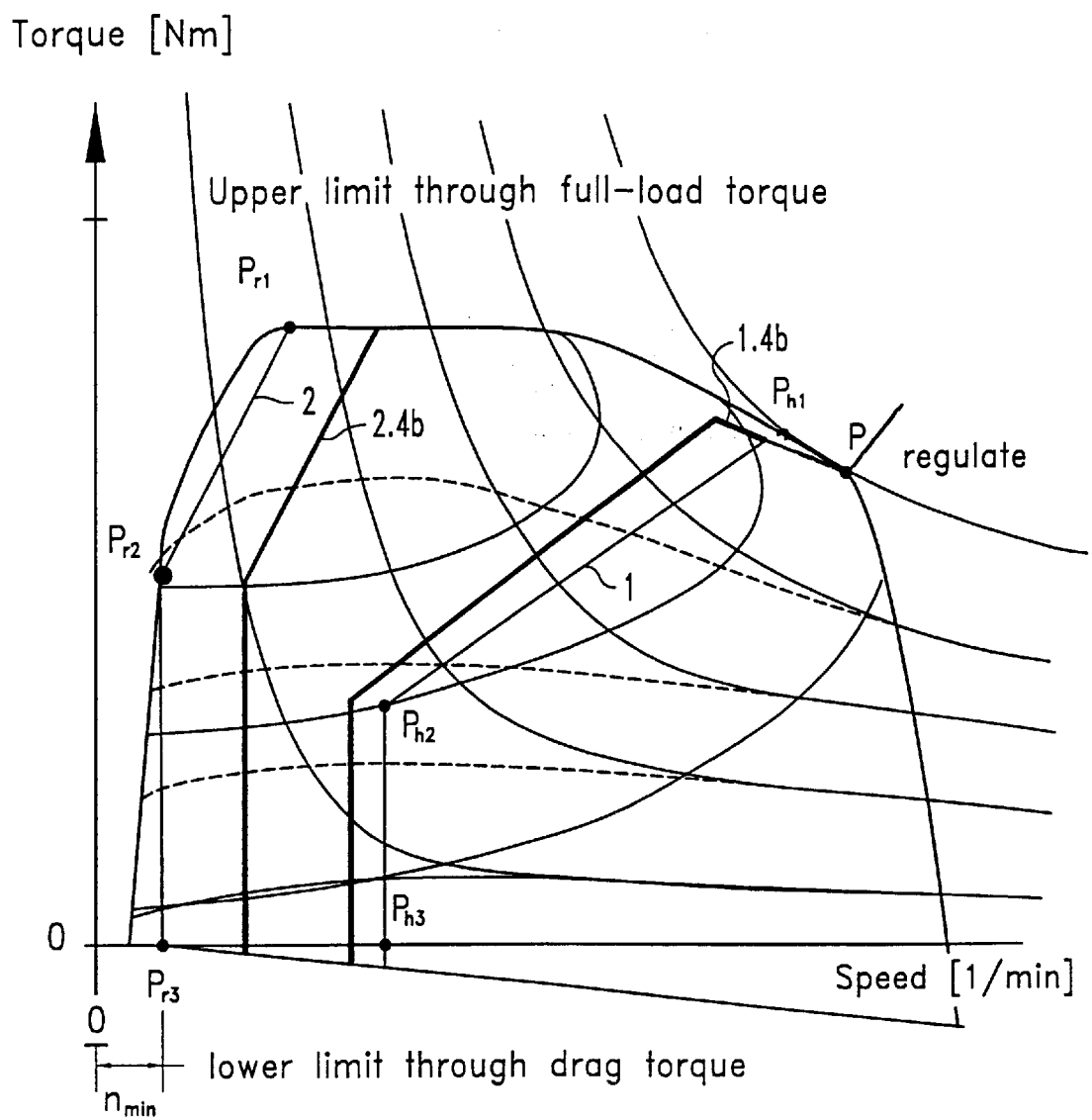
Figure 4C:
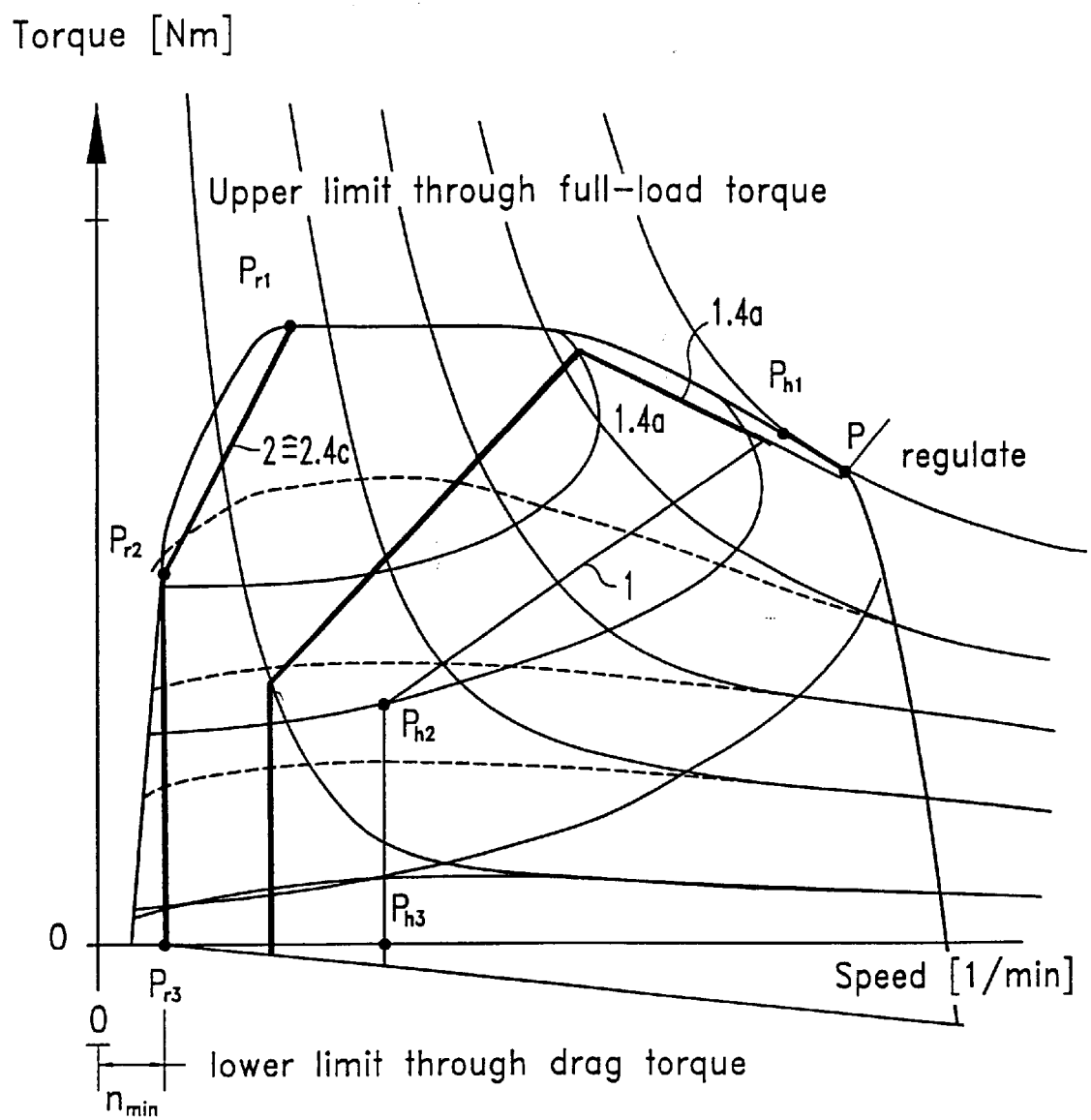

As a further criterion, the vehicle mass can bring about a shifting of the working range. An empty vehicle operates with a working range shifted to the left; if the vehicle is full, the working range is shifted to the right in the torque-speed characteristic diagram of the motor. What holds as for the vehicle mass also holds for the roadway gradient. A juxtaposition of different states is illustrated in FIGS. 4a to 4c. FIG. 4a describes a working range for high dynamic demands, such as are characterized for example in travels on gradients with heavy loads and a wish of the driver's for more power. The characteristic line for the lower speed limit range 2.4a is shifted toward higher motor speeds. The characteristic line for the upper speed limit range 1.4a corresponds to the characteristic line of the upper basic limit speed range 1. FIG. 4b explains the resulting working range for intermediate dynamics demands, for example travel on slopes as well as a high loading density. The characteristic line for the lower speed limit range 2.4b is shifted toward higher motor speeds. The characteristic line for the upper speed limit range 1.4b is shifted toward lower speeds with respect to the basic speed limit range 1. In contrast to this FIG. 4c explains the working range for low dynamics but high economy. The displacement of the working range occurs here in the direction of the full-load characteristic line before the bend-off point by displacement of the characteristic line for the upper limit speed range to lower drive speeds corresponding to the characteristic line 1.4c.

Figure 5:
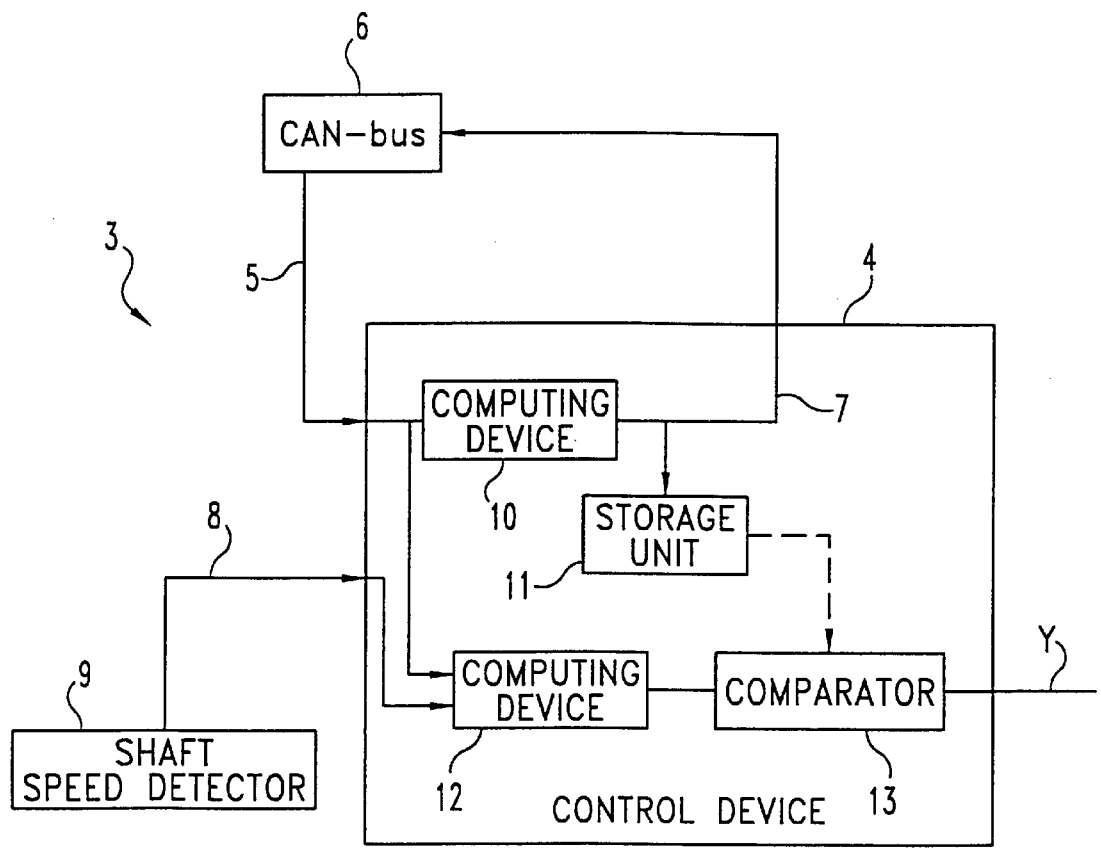
FIG. 5 explains in a schematic and highly simplified representation the basic structure of a gear control for the execution of the process according to the invention in vehicles with integrated CAN-bus or a similar communication interface.

FIG. 5 explains in schematically simplified representation with the aid of a block circuit diagram the construction of a preferably usable gear control device for the execution of the process of the invention to be used in automatic gears in vehicles with integrated CAN-bus.

The gear control 3 comprises a control device 4. This has at least two inputs and two outputs. A first input 5 is couplable there with the communication interface of the control devices in the vehicle, the CAN-bus 6, and so is a first output 7. Over the input 5 the control device 4 can resort to the motor characteristic diagram deposited in the CAN-bus 6. On first setting in operation of the driveline the gear control generates at least the basic limit speeds in the motor characteristic field and therewith it bounds the working range for the motor-gear cooperation. In the event that further advantageous properties of the switching processes to be undertaken (for example undertaking of switchings only in the most use-favorable range), this can likewise be taken into consideration in the generating of the limit speed ranges. The corresponding algorithm for the automatic generation of the basic limit range or for the possible restrictions of this range is a component of the gear control and is likewise offered with delivery of the gear system and of the appertaining control device. This can take place over a computing arrangement 10. The motor characteristic diagram bounded in this way with respect to the working range can then be deposited into a storage unit 11 of the gear control device and/or into the can-bus 6. Further, in the gear control there is deposited the algorithm for the decision regarding the undertaking and the choice of the type of the switching process to be carried out, which is a continuous process. The corresponding input magnitudes to be taken into account, as already stated, are largely taken from the CAN-bus 6 or fed to the gear control device over corresponding couplings with the 4 detection arrangements required for them. Top this end, for example, a further second input 8 is coupled with an arrangement 9 for the detection of a magnitude characterizing at least indirectly the actual speed of the gear output shaft. The control device 4 comprises further at least one computing arrangement 12 which determines the hypothetically attainable connection speeds—in the target gear to be shifted into and/or in the still actual gear in the case of non-occurring switching—from the input magnitudes. The computing arrangement is coupled with a comparison arrangement 13, to which at least the calculated magnitudes and the limit speeds are feedable for processing. In correspondence to the result of the comparison at least one control magnitude Y is generated for the driving of the setting members to be actuated for the gear change, and is issued to at least one further output 14. The gear change is completed or is not completed.

Formula Symbols Used a Lengthwise acceleration b_e Effective specific fuel consumption B Fuel consumption h Geodetic height $k_{hx}$ Multiplier for the point x for the upshifting $k_{rx}$ Multiplier for the point x for the downshifting Lg Load giver position p Air pressure P_mot Motor performance/power Ped Gas pedal position Ped' Speed/rate of change of the gas pedal position Ped_br Brake pedal position $n_{regulated}$ Speed at which the regulating begins $n_{min}$ Lower limit speed $n_{hx}$ Upshift speed at the point x $n_{rx}$ Downshift speed at the point x n_mot Motor speed n_mot' Motor speed acceleration n_mot_pr_h Prognosticated motor speed for the time point $t_o+t_{shift}$ in the gear stage g+1 after the upshift from gear g n_mot_pr Prognosticated, motor speed for the time point $t_o+t_{shift}$ in the gear stage g when no switching is performed n_ab Off-drive speed at the gear output n_ab' Off-drive speed acceleration at the gear output M_mot Motor torque v Traveling speed psi Yaw angle Psi_Punkt Yaw angle speed $r_{dyn}$ Dynamic running radius $t_o$ Actual time point $t_{Shift}$ Switching duration $i_{axial}$ Axial translation $i_{spr}$ Max. ratio of the translation of two successively following gears

What is claimed is:

1. A process for the control of switching processes in automatic gears with an allocatable control device for use in drivelines of vehicles with at least one drive motor comprising the steps of:

in a first process step the actual values of certain travel-dynamics magnitudes for a certain time point $t_o$ are detected or calculated;

in a second process step, from the actual values there is determined a theoretically achievable connection speed of the drive motor, n_mot_pr_h in the target gear $tgt_{gtg}=g_{act}+n$ with $n \geq 1$, or n_mot_pr in the actually shifted-to gear $g_{act}$, for each time step $t=t_o+t_{shift}$; and in a third process step the ascertained connection speeds are compared with limit speeds that can be stipulated in a characteristic diagram of the drive motor, in which in dependence on the comparison results, either no switching process or an upshift- or downshift- switching process is initiated by drive of the actuators actuatable for the carrying out of a gear change.

2. The process according to claim 1, wherein the travel-dynamics magnitudes in the first process step include at least the following actual values for the time point to:

n_mot—motor speed;

n_ab—output speed of the gear;

Ped—gas pedal position;

Ped—br—brake pedal position; and a magnitude (v or $i_{axial}$, $r_{dynamic}$, together with the off drive speed n_ab) at least indirectly characterizing the traveling speed.

3. The process according to claim 1, wherein the detection or determination of the actual values of the travel-dynamics magnitudes, the determination of the theoretically attainable connection speeds of the drive motor, n_mot_pr_h in the target gear $g_{act}$-$g_{act}$+n with $n\geq1$, or n_Mot_pr in the actually shifted-in gear $g_{act}$, and the comparison of the latter with the limit speeds that can be stipulated in the characteristic diagram of the drive motor, occurs continuously.

4. The process according to claim 1, wherein for the third process step:

under the conditions that the ascertained connection speed n_mot_pr_h at the time point $t=t_o+t_{shift}$ in the target gear $g_{tgt}=g_{act}+n$ is greater than the lower limit speed, or the ascertained connection speed n_mot_pr at the time point $t=t_o+t_{shift}$ for the actually shifted-in gear $g_{act}$ is greater than the upper limit speed, an upshift process is initiated; and, under the condition that the ascertained connection speed n_mot_pr for the time point $t=t_o+t_{shift}$ for the actually shifted-in gear $g_{act}$ is less than the lower limit speed, a downshift process is initiated.

5. The process according to claim 1, wherein:

characteristic lines for the limit speeds in a characteristic field of the drive motor are automatically generated from the motor characteristic diagram for at least in each case three coordinates;

the individual coordinates for generating the characteristic line of the upper limit speed are established as follows:

$P_{h1}$=(speed $n_{h1}=k_{h1} \times n_{regulated}$; M=full load line);

$P_{h2}=(n_{r2}=\max\{k_{h2} \times (n_{regulated}-n_{min})+n_{min}; n_{r2} \times i_{spr}\})$; M is yielded by the intersection point with the line of a certain specific fuel consumption $b_e$, for example $b_e$=230 g/(kWh)); and $P_{h3}=(n_{h3}=\max\{k_{h3} \times n_{h2}; n_{r3} \times i_{spr}\}$; M=0), in which the factors $k_{h1}$, $k_{h2}$, $k_{h3}$ and $k_{r1}$ are established statistically; and the individual coordinates for the characteristic line are established as follows:

$P_{r1}$ corresponds the bend-off point of the full load line with constant motor torque;

$P_{r2}$ is yielded from the intersection point of the full load line with the characteristic line for the specific fuel consumption which was used for the establishing of the second point $P_{h2}$, or this is determined from the relation $n_{r2}=k_{r2} \times n_{r1}$; and $P_{r3}$ is yielded from the dropping of the plumb line from point $P_{r2}$ onto the speed axis.

6. The process according to claim 5, wherein the characteristic lines for at least one of the upper and lower limit speeds are modified by the consideration at least of one of the following magnitudes:

gas pedal speed, and vehicle mass, and roadway gradient.

7. The process according to claim 1 for use in drivelines of vehicles with integrated CAN-Bus or another communication interface, which is coupled with the automatic gear, wherein:

a large number of the required travel-dynamics magnitudes are feedable to the control device of the automatic gear over the CAN-bus; and characteristic data of a characteristic field of the drive motor are feedable over the CAN-Bus to the control device of the automatic gear.

8. The process according to claim 1, wherein the theoretically achievable connection speed of the drive motor, n_mot_pr_h in the target gear $g_{tgt}=g_{act}+n$ with $n \geq 1$, is determined according to the equation $$n\_mot\_pr\_h(t_o+t_{shift})=(n\ ab'(t_o) \times i(g+1)+f\_\text{korr}).$$

9. The process according to claim 8, wherein the correction value f_korr for each executed switching is determined from the difference between the theoretically achievable and an actually achieved connection speed and is stored in an experiment table.

10. The process according to claim 9, wherein the experiment table characteristic magnitudes are storable in addition to the conditions under which the switching operation was performed.

11. A control device for automatic gears in drivelines of vehicles with a drive motor, comprising:

at least two inputs and an output for the issuing of a control magnitude for the at least indirect governing of a setting member actuatable for the carrying out of a gear change;

the inputs are coupled in each case with arrangements for the detection of travel-dynamics magnitudes;

a first computing arrangement for establishing limit speeds for a characteristic field of the drive motor;

a further second computing arrangement for computing from the travel-dynamic magnitudes fed in over the inputs a hypothetically achievable connection speed in a target gear to be shifted into, or in an actual gear, in the case of non-occurring switching; and a comparator arrangement coupled with the second computing arrangement;

wherein at least the computed connection speeds and further limit speeds are feedable for processing to the comparator arrangement and the comparator arrangement is connected at least indirectly with the output of the control device.

12. The control device according to claim 11 for use in vehicles with an integrated CAN-Bus, wherein:

the first input is coupled with the CAN-Bus;

the second input is coupled with an arrangement for detecting the output speed of the gear; and the control device further comprising a second output, which is coupled with the CAN-Bus.

13. A process for the control of switching processes in automatic gears with an allocatable control device for use in drive lines of vehicles with at least one internal combustion engine comprising the steps of:

in a first process step the actual values of certain travel-dynamics magnitudes for a certain time point $t_o$ are detected or calculated;

in a second process step, from the actual values there is determined a theoretically achievable connection speed of the internal combustion engine, n_mot_pr_h in the target gear $g_{tgt}=g_{act}+n$ with $n \geq 1$, or n_mot_pr in the actually shifted-to gear $g_{act}$, for each time step $t=t_o+t_{shift}$; and in a third process step the ascertained connection speeds are compared with limit speeds that can be stipulated in a characteristic diagram of the internal combustion engine, in which in dependence on the comparison results, either no switching process or an upshift- or downshift- switching process is by drive of the actuators actuatable for the carrying out of a gear change.

* * * * *

UNITED STATES PATENT AND TRADEMARK OFFICE
CERTIFICATE OF CORRECTION

PATENT NO. : 6,456,919 B1
DATED : September 24, 2002
INVENTOR(S) : Körner et al.

It is certified that error appears in the above-identified patent and that said Letters Patent is hereby corrected as shown below:

<u>Column 17,</u>
Line 46, change "tgt$_{gtg}$" to -- g$_{tgt}$ --

Signed and Sealed this

Seventeenth Day of June, 2003

JAMES E. ROGAN
*Director of the United States Patent and Trademark Office*